United States Patent
Hu et al.

(10) Patent No.: US 9,349,207 B2
(45) Date of Patent: May 24, 2016

(54) APPARATUS AND METHOD FOR PARSING HUMAN BODY IMAGE

(71) Applicant: Samsung Electronics Co., Ltd., Suwon-si, Gyeonggi-do (KR)

(72) Inventors: Zhilan Hu, Beijing (CN); Lujin Gong, Beijing (CN); Xun Sun, Beijing (CN); Chang Kyu Choi, Seongnam-si (KR); Fan Zhang, Beijing (CN); Ji Yeun Kim, Seoul (KR); Kee Chang Lee, Yongin-si (KR); Maolin Chen, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 13/894,740

(22) Filed: May 15, 2013

(65) Prior Publication Data

US 2013/0322720 A1     Dec. 5, 2013

(30) Foreign Application Priority Data

May 31, 2012  (CN) .......................... 2012 1 0176875
Dec. 3, 2012  (KR) ........................ 10-2012-0138943

(51) Int. Cl.
| G06T 15/00 | (2011.01) |
| G06T 7/00  | (2006.01) |
| G06K 9/46  | (2006.01) |
| G06K 9/00  | (2006.01) |
| G06K 9/44  | (2006.01) |

(52) U.S. Cl.
CPC ............ *G06T 15/00* (2013.01); *G06K 9/00362* (2013.01); *G06K 9/44* (2013.01); *G06K 9/4642* (2013.01); *G06T 7/0046* (2013.01); *G06T 7/0051* (2013.01); *G06T 2207/10028* (2013.01); *G06T 2207/20044* (2013.01); *G06T 2207/30196* (2013.01)

(58) Field of Classification Search
CPC ....... G06T 15/00; G06T 15/06; G06T 15/405; G06T 17/00; G06T 17/20; G06T 19/00; G06T 2207/10076; G06T 2207/10136; G06T 2207/10144; G06T 2207/10152; G06T 2207/30008; G06T 2207/30012; G06T 7/0051; G06K 9/44; G06K 9/46; G06K 9/4642; G06K 9/00362

See application file for complete search history.

(56) References Cited

U.S. PATENT DOCUMENTS

| 3,432,657 | A  | * | 3/1969  | Slavin ............................. 378/41 |
| 6,215,890 | B1 |   | 4/2001  | Matsuo et al. |
| 6,490,476 | B1 | * | 12/2002 | Townsend et al. ............ 600/427 |
| 6,614,874 | B2 | * | 9/2003  | Avinash ........................... 378/62 |
| 6,819,782 | B1 |   | 11/2004 | Imagawa et al. |
| 6,973,219 | B2 | * | 12/2005 | Avinash ........................ 382/260 |
| 7,212,665 | B2 |   | 5/2007  | Yang et al |
| 7,711,089 | B2 | * | 5/2010  | Boyden et al. .................. 378/87 |
| 7,899,220 | B2 | * | 3/2011  | Haex et al. ..................... 382/128 |

(Continued)

FOREIGN PATENT DOCUMENTS

EP      2239708 A2 * 10/2010   ............. G06T 17/00
KR   10-2002-0031591       5/2002

(Continued)

*Primary Examiner* — Manav Seth
(74) *Attorney, Agent, or Firm* — NSIP Law

(57) ABSTRACT

An apparatus and method for parsing a human body image may be implemented by acquiring a depth image including a human body, and detecting a plurality of points in the acquired depth image by conducting a minimum energy skeleton scan on the depth image.

23 Claims, 12 Drawing Sheets

(56) References Cited

U.S. PATENT DOCUMENTS

| | | | |
|---|---|---|---|
| 8,049,752 B2* | 11/2011 | Yang et al. | 345/424 |
| 8,078,255 B2* | 12/2011 | Bhandarkar et al. | 600/407 |
| 8,213,680 B2 | 7/2012 | Fitzgibbon et al. | |
| 8,693,634 B2* | 4/2014 | Ramamurthi et al. | 378/98.11 |
| 8,766,977 B2* | 7/2014 | Kim et al. | 345/420 |
| 2005/0226376 A1* | 10/2005 | Yun et al. | 378/62 |
| 2006/0274947 A1 | 12/2006 | Fujimura et al. | |
| 2007/0268295 A1 | 11/2007 | Okada | |
| 2010/0238168 A1* | 9/2010 | Kim et al. | 345/420 |
| 2012/0157207 A1 | 6/2012 | Craig et al. | |
| 2013/0251192 A1* | 9/2013 | Tu et al. | 382/103 |
| 2014/0357369 A1* | 12/2014 | Callens et al. | 463/36 |

FOREIGN PATENT DOCUMENTS

| | | |
|---|---|---|
| KR | 10-2007-0008601 | 1/2007 |
| KR | 10-2009-0119442 | 11/2009 |
| KR | 10-2011-0032351 | 3/2011 |
| KR | 10-2011-0040074 | 4/2011 |
| KR | 10-1035291 | 5/2011 |

* cited by examiner

APPARATUS AND METHOD FOR PARSING HUMAN BODY IMAGE

CROSS-REFERENCE TO RELATED APPLICATIONS

This application claims priority to Chinese Patent Application No. 201210176875.8, filed on May 31, 2012, in the Chinese Patent Office and Korean Patent Application No. 10-2012-0138943, filed on Dec. 3, 2012, in the Korean Intellectual Property Office, the disclosures of which are incorporated herein by reference.

BACKGROUND

1. Field

Embodiments disclosed herein relate to an image processing technology, and more particularly, to an apparatus and method for parsing a human body image.

2. Description of the Related Art

Recently, active research is being conducted on parsing of a human body image and a wide range of applications to which parsing of a human body image may be applied, for example, human-machine interaction, medical applications, and the like.

Generally, parsing of a human body image is based on matching, classification, and feature analysis.

The matching-based parsing collects a plurality of samples including human body parts, and matches a depth image or a depth-of-field image to a database. Here, the parsing accuracy depends on data in the database.

The classification (categorization)-based parsing involves training a classifier in advance. To train the classifier, a great amount of random training data is required, and parsing accuracy relies on the selection of training data.

The feature analysis-based parsing includes feature extraction and analysis. The need for training data and a database is absent. However, since the extracted feature is sensitive to noise, parsing a human body image having a complicated pose is difficult.

Accordingly, there is a demand for parsing of a human body image with improved accuracy and stability.

SUMMARY

The exemplary embodiments disclosed herein may include an apparatus and method for parsing a human body image that may parse a complex human body image, for example, a human body disposed in various environments or having a complicated pose. Further, the apparatus and method for parsing a human body image according to the embodiments disclosed herein, may ensure high parsing accuracy, and may eliminate the need for a large database and training data.

The exemplary embodiments may also include an apparatus and method for parsing a human body image that may implement pose estimation, pose tracking, and body modeling using parsed skeleton data, for example, skeleton points or skeletons, representing an overall position and shape of a human body in a depth image.

The exemplary embodiments may also include an apparatus and method for parsing a human body image that may achieve accurate skeleton-based parsing of each part of a human body.

According to one aspect, there is provided a method of parsing a human body image, the method including acquiring a depth image including a human body, and detecting a plurality of points in the acquired depth image by conducting a minimum energy skeleton scan on the depth image.

The minimum energy skeleton scan may correspond to the detection of the plurality of points in the depth image by minimizing an energy function for the depth image, the plurality of points being defined to be a skeleton point, and the energy function may correspond to a logarithm of a sum of opposite numbers for a probability that a pixel of the depth image is predicted as a skeleton point or a non-skeleton point.

In the depth image, a pixel may be determined to be a skeleton point when the probability that the pixel is predicted as a skeleton point is applied to the sum of opposite numbers and the energy function is minimized, and may be determined to be a non-skeleton point when the probability that the pixel is predicted as a non-skeleton point is applied to the sum of opposite numbers and the energy function is minimized.

The probability that a pixel is predicted as a non-skeleton point may be determined by a normalized value of a smallest value among a depth contrast of a predetermined direction, a depth contrast of a direction opposite to the predetermined direction, and a depth contrast threshold value.

The depth contrast of the predetermined direction may be defined to be an absolute value of a difference in depth values between a first pixel located at a predetermined distance from the pixel in a predetermined direction and a pixel located adjacent to the first pixel.

The adjacent pixel may be located adjacent to the first pixel in the predetermined direction or the direction opposite to the predetermined direction.

The predetermined distance may correspond to a minimum distance satisfying a depth contrast constraint in the predetermined direction or the direction opposite to the predetermined direction, and may be represented by Equation:

$$l_x = \min_{l} \max_{\theta \in [0, 2\pi]} (|d_{x, l-1, \theta} - d_{x, l, \theta}| > T)_{l \in (l_{min}, l_{max})} \quad \text{[Equation]}$$

wherein '$l_x$' denotes the predetermined distance, ($l_{min}$, $l_{max}$) denotes a value range of a distance '$l$', $\theta$ denotes a direction, T denotes a depth contrast threshold value, $d_{x, l, \theta}$ denotes a depth value of a pixel located at the predetermined distance '$l$' from the pixel in the direction $\theta$, and $d_{x, l-1, \theta}$ denotes a depth value of a pixel adjacent to the pixel located at the predetermined distance '$l$' from the pixel.

The method may further include acquiring a low-resolution skeleton image by conducting a minimum energy skeleton scan on the depth image using a first depth contrast threshold value higher than a predetermined threshold value, and acquiring a high-resolution skeleton image by conducting a minimum energy skeleton scan on the depth image using a second depth contrast threshold value lower than or equal to the predetermined threshold value.

The acquiring of the low-resolution skeleton image may include acquiring a plurality of skeleton points by conducting a minimum energy skeleton scan on the depth image using the first depth contrast threshold value, classifying the plurality of skeleton points or a skeleton formed from the skeleton points based on a type of body part by continuous constraints of location and depth, and acquiring a body part region by extending the skeleton corresponding to the type of body part.

The extending of the skeleton may include extending the skeleton points forming the skeleton by the predetermined distance in the predetermined direction and the direction opposite to the predetermined direction.

The acquiring of the high-resolution skeleton image may include acquiring a plurality of skeleton points by conducting a minimum energy skeleton scan on the depth image using the second depth contrast threshold value, classifying the plurality of skeleton points or a skeleton formed from the skeleton points based on a type of body part by continuous constraints of location and depth, and acquiring a body part region by extending the skeleton corresponding to the type of body part.

The conducting of the minimum energy skeleton scan on the depth image may include acquiring a plurality of groups of skeleton points and a plurality of skeleton images by conducting the minimum energy skeleton scan on the depth image using at least one predetermined direction and at least two depth contrast threshold values or at least two predetermined directions and at least one depth contrast threshold value, determining a depth image including the skeleton point to be a skeleton image, classifying the skeletons included in the skeleton images based on a type of body part by the continuous constraints of location and depth, acquiring a body part region by extending the skeleton corresponding to the type of body part in the skeleton image, overlaying the skeletons extended to acquire the body part regions, based on the degree of overlap of the corresponding body part regions in the plurality of skeleton images. When the degree of overlap of the corresponding body part regions in the plurality of skeleton images is greater than a predetermined threshold, a longest skeleton may be determined to be a final skeleton among the skeletons extended to acquire the plurality of body part regions, and when the degree of overlap of the corresponding body part regions in the plurality of skeleton images is lower than or equal to the predetermined threshold, the skeletons extended to acquire the plurality of body part regions may be overlaid.

The acquiring of the low-resolution skeleton image may include conducting a minimum energy skeleton scan on the depth image using at least two predetermined directions and a first depth contrast threshold value, and extending the overlaid skeletons in the depth image.

The acquiring of the high-resolution skeleton image may include conducting a minimum energy skeleton scan on the depth image using at least two predetermined directions and a second depth contrast threshold value, and extending the overlaid skeletons in the depth image.

The method may further include extracting a torso (trunk) region in a low-resolution depth image, parsing a non-limb region in the low-resolution skeleton image based on the determined torso region, optimizing an upper limb region using a body part region corresponding to an upper limb in a high-resolution depth image, and segmenting the parsed lower limb region into legs and hips using the high-resolution depth image.

The extracting of the torso region in the low-resolution depth image may include determining the torso region based on a size and a location of the body part region in the low-resolution skeleton image, extracting a skeleton of the torso region by conducting a minimum energy skeleton scan on the determined torso region, determining a region below the center of the whole body region to be a lower limb region, excluding the region below the center from the determined torso region, and determining left and right edges of the torso region by scanning in left and right directions from the center to a background region or a four-limb region along the skeleton.

The parsing of the non-limb part in the low-resolution skeleton image based on the determined torso region may include parsing the non-limb region in the low-resolution skeleton image based on a connected location with the determined torso region.

The optimizing of the upper limb region using the depth body part region corresponding to the upper limb in the high-resolution depth image may include searching for, when the parsed upper limb region is present, a body part region overlapping with the parsed upper limb region in the high-resolution skeleton image, and extending the parsed upper limb region to the depth body part region, and searching for, when the parsed upper limb region is absent, the parsed body part region corresponding to the head and/or the torso in the high-resolution skeleton image, determining body part regions having different depths from a neighboring region of the corresponding body part region to be a candidate upper limb region, removing a candidate upper limb region having higher depth than the neighboring region, and determining a final upper limb region among the remaining candidate upper limb regions based on a combination of a relative size and a location.

The segmenting of the parsed lower limb region into the legs and the hips using the high-resolution depth image may include determining, to be the legs, a region among the parsed lower limb region corresponding to a lower limb region in the high-resolution skeleton image, and determining the remaining region to be the hips.

The method may further include preprocessing. The preprocessing may include removing a background region from the acquired depth image.

According to another aspect, there is provided an apparatus for parsing a human body image, the apparatus including a depth image receiving unit configured to acquire a depth image including a human body, and a skeleton scanning unit configured to detect a plurality of points in the acquired depth image by conducting a minimum energy skeleton scan on the depth image.

The minimum energy skeleton scan may correspond to detection of the plurality of points in the depth image by minimizing an energy function for the depth image, the plurality of points being defined to be a skeleton point, and the energy function may correspond to a logarithm of a sum of opposite numbers for a probability that a pixel of the depth image is predicted as a skeleton point or a non-skeleton point.

In the depth image, a pixel may be determined to be a skeleton point when the probability that the pixel is predicted as a skeleton point is applied to the sum and the energy function is minimized, and may be determined to be a non-skeleton point when the probability that the pixel is predicted as a non-skeleton point is applied to the sum of opposite numbers and the energy function is minimized.

The apparatus may further include a preprocessing unit configured to remove a background region from the acquired depth image.

The apparatus may further include a part parsing unit configured to parse each part of the human body using the acquired skeleton points.

The part parsing unit may include a torso segmentation unit configured to extract a torso region in a low-resolution depth image, a coarse body parsing unit configured to parse a non-limb part in a low-resolution skeleton image based on the determined torso region, and a fine body parsing unit configured to optimize an upper limb region using a body part region corresponding to the parsed upper limb in a high-resolution depth image and to segment the parsed lower limb region into legs and hips using the high-resolution depth image.

The torso segmentation unit may include a torso region extracting unit configured to determine the torso region based on a size and a location of the body part region in the low-resolution skeleton image, a torso location estimating unit configured to extract a skeleton of the torso region by conducting a minimum energy skeleton scan on the determined torso region, and a torso region refining unit configured to determine a region below the center of the human body region to be a lower limb region, to exclude the region below the center from the determined torso region, and to determine left and right edges of the torso region by scanning in left and right directions from the center to a background region or a four-limb region along the skeleton.

When the parsed upper limb region is present, the fine body parsing unit may be configured to search for a body part region overlapping the parsed upper limb region in the high-resolution skeleton image, and to extend the parsed upper limb region to the depth body part region. When the parsed upper limb region is absent, the fine body parsing unit may be configured to search for the parsed body part region corresponding to the head and/or the torso in the high-resolution skeleton image, to determine body part regions having different depths from a neighboring region of the corresponding body part region to be a candidate upper limb region, to remove a candidate upper limb region having a higher depth than the neighboring region, and to determine a final upper limb region among the remaining candidate upper limb regions based on a combination of a relative size and a location.

The skeleton scanning unit may acquire a low-resolution skeleton image by conducting a minimum energy skeleton scan on the depth image using a first depth contrast threshold value, and acquire a high-resolution skeleton image by conducting a minimum energy skeleton scan on the depth image using a second depth contrast threshold value. The skeleton scanning unit may classify skeletons in each skeleton image as a type of body part, based on a location and depth information of the skeleton.

The part parsing unit may parse each part of the human body in the depth image, and may include: a torso segmentation unit to determine a torso region using the low-resolution skeleton image, to acquire a skeleton corresponding to the torso region, and to extract skeleton points of the torso region; a coarse body parsing unit to parse a plurality of regions other than the torso region based on a relative location to the torso region; and a fine body parsing unit to optimize a first body part region parsed by the coarse body parsing unit, using a depth body part region and the high-resolution skeleton image. The fine body parsing unit may optimize the first body part region by determining whether the first body part region overlaps with the torso region, and may extend the first body part region to the depth body part region if the first body part region overlaps the torso region.

According to another aspect, there is provided a method of parsing a human body image, the method including acquiring a depth image including a plurality of pixels and acquiring a plurality of skeletons by performing a minimum energy skeleton scan on the depth image and analyzing each pixel from the depth image to determine whether the pixel is a skeleton point or a non-skeleton point.

The apparatus and method for parsing a human body image may parse a complex human body image, for example, of a human body disposed in various environments or in a complicated pose. The apparatus and method for parsing a human body image may ensure high parsing accuracy, and may eliminate the need for a large database and training data.

The apparatus and method for parsing a human body image may implement pose estimation, pose tracking, and body modeling using parsed skeleton data, for example, skeleton points or skeletons, representing an overall position and shape of a human body in a depth image.

The apparatus and method for parsing a human body image may achieve accurate skeleton-based parsing of each part of a human body.

Additional aspects of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
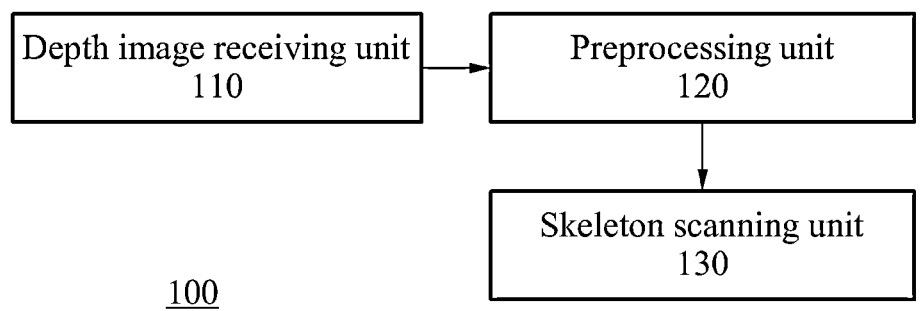
FIG. 1 illustrates an apparatus for parsing a human body image according to an exemplary embodiment.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an apparatus 100 for parsing a human body image according to an exemplary embodiment.

Referring to FIG. 1, the apparatus for parsing a human body image may include a depth image receiving unit 110, a preprocessing unit 120, and a skeleton scanning unit 130.

The depth image receiving unit 110 may receive a depth image including a human body. For example, the depth image receiving unit 110 may receive a depth image from a source, for example, a depth image photographing device, a storage device, or over a wired or wireless network, and the like.

The preprocessing unit 120 may preprocess the depth image received by the depth image receiving unit 110. The preprocessing unit 120 may acquire the preprocessed depth image by filtering off noise from the depth image and removing a background region from the depth image. The background region may be removed using various background removal techniques. Through the preprocessing unit 120, an amount of data to be processed may be reduced by acquiring a coarse human body region.

The skeleton scanning unit 130 may conduct a minimum energy skeleton scan on the depth image received by the depth image receiving unit 110 or the preprocessed depth image obtained in the preprocessing unit 120, to acquire the scanned skeleton points or skeletons.

Figure 2:
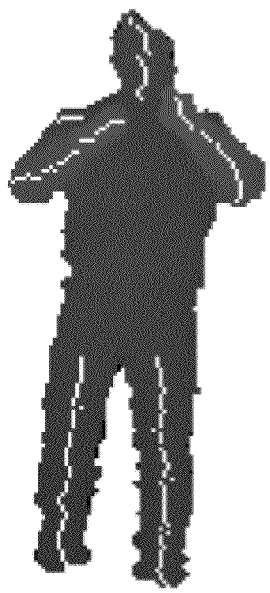
FIG. 2 illustrates an example of skeletons acquired by a skeleton scanning unit of an apparatus for parsing a human body image according to an exemplary embodiment.

FIG. 2 an example of skeletons acquired by a skeleton scanning unit of an apparatus for parsing a human body image according to an exemplary embodiment.

Referring to FIG. 2, the minimum energy skeleton scan may refer to acquisition of a plurality of points from a depth image by minimizing an energy function with constraints of size and depth continuity. Here, the plurality of points may be referred to as a skeleton point, and may compose skeletons.

The energy function may correspond to a logarithm of a sum of opposite numbers for a probability that a pixel of the depth image is predicted as a skeleton point or a non-skeleton point.

For each pixel of the depth image, a pixel may be determined to be a skeleton point by minimizing the energy function using the probability that the pixel is predicted as a skeleton point, and may be determined to be a non-skeleton point by minimizing the energy function using the probability that the pixel is predicted as a non-skeleton point.

When the probability that the pixel is predicted as a skeleton point is applied to the sum of opposite numbers and the energy function is minimized, a pixel may be determined to be a skeleton point, and when the probability that the pixel is predicted as a non-skeleton point is applied to the sum of opposite numbers and the energy function is minimized, a pixel may be determined to a non-skeleton point. Here, the determining of the pixel to be a skeleton point or a non-skeleton point may be based on whether the skeleton point or the non-skeleton point is involved in calculating the sum of opposite numbers, rather than based on the probability.

The energy function subject to constraints of size and depth continuity may be represented by Equation 1.

$$\min_{\alpha} E(x, \theta, \alpha) = \min_{\alpha} \sum_{x \in Im} -\log_n(p(x; \alpha_x)),$$ [Equation 1]
$$\alpha_x = \{0, 1\}$$

In Equation 1, 'Im' denotes a depth image, 'x' denotes a pixel in the depth image 'Im', and $\alpha_x$ denotes a skeleton or non-skeleton point for the pixel 'x'. When the pixel 'x' corresponds to a skeleton point, $\alpha$=1, and when the pixel 'x' corresponds to a non-skeleton point, $\alpha$=0. p(x;1) denotes a probability that the pixel 'x' is predicted as a skeleton point, and p(x;0) denotes a probability that the pixel 'x' is predicted as a non-skeleton point, wherein n>0 (n≠1). $\theta$ may denote a predetermined direction.

The probability p(x;1) that the pixel 'x' is predicted as a skeleton point may be determined by a normalized value of a smallest value among depth contrasts of two opposite directions and a depth contrast threshold value.

The depth contrast may be defined to be an absolute value of a difference in depth values between a first pixel $x_{x,l_x,\theta}$ located at a predetermined distance 'lx' from the pixel 'x' in a predetermined direction $\theta$ and a second pixel $x_{x,l_x-1,\theta}$ located adjacent to the pixel $x_{x,l_x,\theta}$. Accordingly, a depth contrast of an opposite direction (for example, $\theta-\pi$) to the predetermined direction $\theta$ may be defined to be an absolute value of a difference in depth value between a pixel $x_{x,l_x,\theta-\pi}$ located at a predetermined distance 'lx' from the pixel 'x' in a predetermined direction $\theta-\pi$ and a pixel $x_{x,l_x-1,\theta-\pi}$ located adjacent to the pixel $x_{x,l_x,\theta-\pi}$. That is, a pixel may be disposed in direction which is 180 degrees opposite, relatively, to an adjacent pixel.

The pixel $x_{x,l_x-1,\theta}$ may correspond to a pixel adjacent to the pixel $x_{x,l_x,\theta}$ in a direction $\theta$ or $\theta-\pi$, and the pixel $x_{x,l_x-1,\theta-\pi}$ may correspond to a pixel adjacent to the pixel $x_{x,l_x,\theta-\pi}$ in a direction $\theta$ or $\theta-\pi$.

The probability that the pixel 'x' is predicted as a skeleton point may be represented by Equation 2.

$$p(x; 1) = \frac{\min\{|d_{x,l_x-1,\theta} - d_{x,l_x,\theta}|, |d_{x,l_x-1,\theta-\pi} - d_{x,l_x,\theta-\pi}|, T\}}{D}$$ [Equation 2]

In Equation 2, $d_{x,l_x-1,\theta}$ denotes a depth value of a pixel $x_{x,l_x-1,\theta}$, $d_{x,l_x,\theta}$ denotes a depth value of a pixel $x_{x,l_x,\theta}$, $d_{x,l_x-1,\theta-\pi}$ denotes a depth value of a pixel $x_{x,l_x-1,\theta-\pi}$, $d_{x,l_x,\theta-\pi}$ denotes a depth value of a pixel $x_{x,l_x,\theta-\pi}$, 'T' denotes a depth contrast threshold value, and 'D' denotes contrast normalization, wherein D≥T.

The probability that the pixel 'x' is predicted as a non-skeleton point may be represented by Equation 3.

$$p(x;0)=1-p(x;1)$$ [Equation 3]

According to another exemplary embodiment, the distance 'lx' may be associated with the depth contrast threshold value 'T'. The distance 'lx' may correspond to a minimum distance satisfying the depth contrast constraint by scanning in each direction, and may be represented by Equation 4.

$$l_x = \min_{l} \max_{\theta \in [0, 2\pi]} (|d_{x,l-1,\theta} - d_{x,l,\theta}| > T)_{l \in (l_{min}, l_{max})}$$ [Equation 4]

$(l_{min}, l_{max})$ denotes a value range of a distance 'l', $d_{x,l,\theta}$ denotes a depth value of a pixel located at the distance 'l' from the pixel 'x' in the direction $\theta$, and $d_{x,l-1,\theta}$ denotes a depth value of a pixel adjacent to the pixel located at the distance 'l' from the pixel 'x'.

In this instance, $l_{min}, l_{max}$ may have different values for different human body parts. This may be associated with a relative length of a part to be scanned. For example, a value range for scanning an upper limb may be narrower than a value range for scanning a whole body.

The use of skeleton points and skeletons acquired from the depth image to detect the human body parts may allow for an accurate acquisition of a body part region. Also, since the skeleton points or the skeletons provide an overall location and shape of human body parts, various human body poses may be estimated simply and readily.

For more accurate skeleton acquisition, the minimum energy skeleton scan may be conducted using a plurality of directions $\theta$ and/or a plurality of depth contrast threshold values 'T', and the scan results may be merged.

An amount of skeleton data acquired may be determined based on the depth contrast threshold value 'T'. As the depth contrast threshold value 'T' is lowered, a greater amount of skeleton data may be acquired. According to the exemplary embodiments, the depth contrast threshold value 'T' may be set differently. That is, the threshold value 'T' may be adjusted and selectively set according to the desired amount of skeleton data to be obtained. To scan a human body part of a relatively larger size, for example, a torso, the depth contrast threshold value 'T' may be set to be a relatively higher value, and to scan a human body part of a relatively smaller size, for example, an arm, the depth contrast threshold value 'T' may be set to be of a relatively lower value.

Figure 3A:
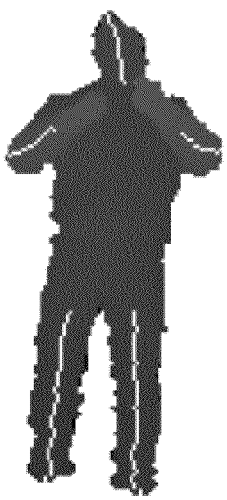
FIGS. 3A and 3B illustrate examples of skeletons acquired using different depth threshold values according to an exemplary embodiment.
Figure 3B:
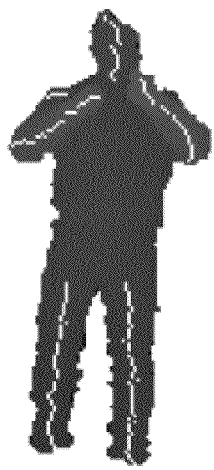

FIGS. 3A and 3B illustrate examples of skeletons acquired using different depth threshold values according to an exemplary embodiment. FIG. 3A illustrates a scan result using a high depth contrast threshold value 'T', and FIG. 3B illustrates a scan result using a low depth contrast threshold value 'T'. It may be found from FIG. 3A that a high depth contrast threshold value 'T' makes skeletons of portions of arms overlapping a torso invisible, and it may be found from FIG. 3B that a low depth contrast threshold value 'T' makes skeletons of arms overlapping a torso visible.

When the depth contrast threshold value 'T' is relatively high, skeleton data may be rich. However skeleton points may be acquired disorderly and have a high possibility that noise will be present. Accordingly, the depth contrast threshold value 'T' may be determined using various adaptation algorithms. For example, the depth contrast threshold value 'T' may be determined based on a magnitude of noise in a contrast image and a size of a target to be scanned.

Further, the results obtained using different depth contrast threshold values 'T' may be combined to acquire accurate skeleton data. For example, the results obtained in FIG. 3A and FIG. 3B may be combined to acquire accurate skeleton data.

Figure 4A:
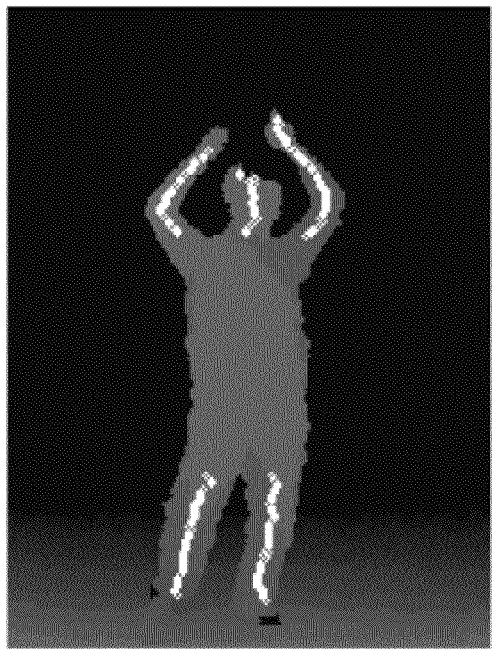
FIGS. 4A and 4B illustrate examples of skeletons acquired in different scan directions according to an exemplary embodiment.
Figure 4B:
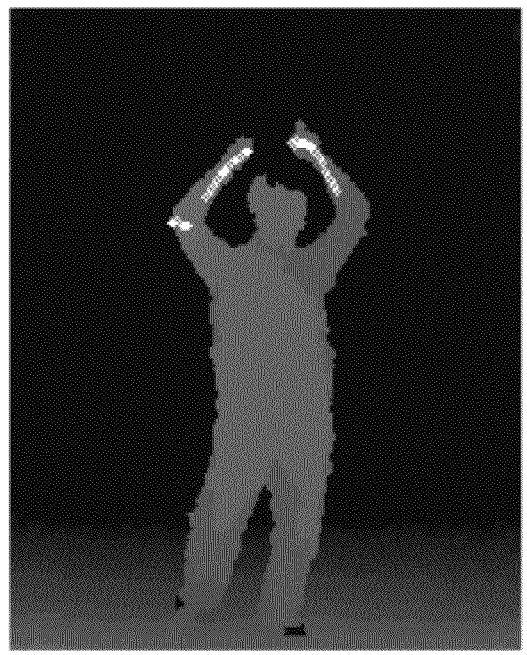

FIGS. 4A and 4B illustrate examples of skeletons acquired in different scan directions according to an exemplary embodiment.

Referring to FIGS. 4A and 4B, the skeleton data acquired using different directions θ may be different. FIG. 4A illustrates a result obtained using a horizontal direction, and FIG. 4B illustrates a result obtained using a vertical direction. As shown in FIG. 4A, horizontal-oriented skeletons may be invisible when the predetermined direction θ corresponds to a horizontal direction, and as shown in FIG. 4B, vertical-oriented skeletons may be invisible when the predetermined direction θ corresponds to a vertical direction.

Accordingly, to obtain a more accurate result, skeleton data acquired using different directions θ and/or different depth contrast threshold values 'T' may be combined or merged.

In such an embodiment, skeleton points or skeletons acquired using different directions θ and/or different depth contrast threshold values 'T' may be overlaid. In another embodiment, for example, skeleton data may be acquired using a first diagonal direction, and skeleton data may be acquired using a second diagonal direction using a second diagonal direction, which is orthogonal or perpendicular to the first diagonal direction. Different threshold values 'T' may be used when obtaining the skeleton data in the first and second diagonal directions. In this manner, skeleton data acquired using the different directions θ and/or different depth contrast threshold values 'T' may be combined or merged, and the skeleton points or skeletons acquired using the different directions θ and/or different depth contrast threshold values 'T' may be overlaid.

Figure 5A:
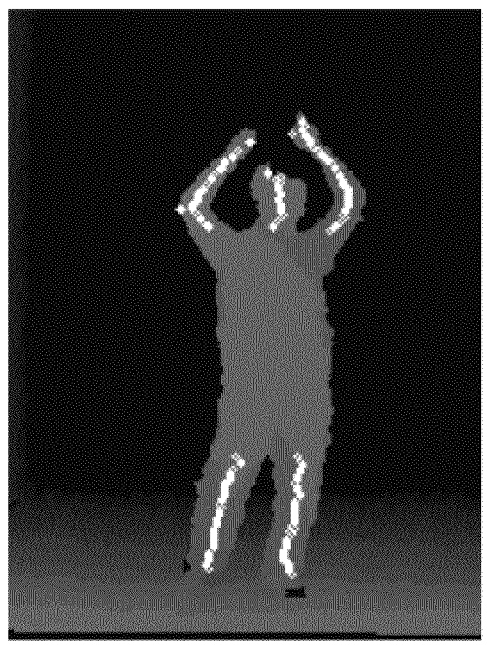
FIGS. 5A and 5B illustrate examples of results obtained by overlaying skeleton data acquired under different conditions according to an exemplary embodiment.
Figure 5B:
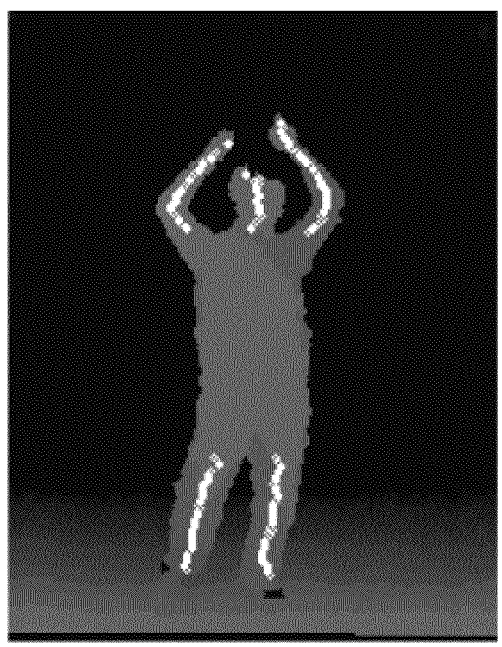

Results obtained by overlaying FIG. 4A with 4B are illustrated in FIGS. 5A and 5B.

FIGS. 5A and 5B illustrate examples of results obtained by overlaying skeleton data acquired under different conditions according to an exemplary embodiment.

To overlay skeletons acquired using different directions θ and/or different depth contrast threshold values 'T', a determination may be made as to a degree of overlap on the skeletons. A determination as to whether to overlay skeletons may be made based on the degree of overlap of the skeletons. When the degree of overlap of the skeletons is greater than a predetermined threshold, a longest skeleton may be determined to be a final skeleton, and when the degree of overlap of the skeletons is lower than or equal to the predetermined threshold, an overlaying process may be executed.

The degree of overlap may include, for example, the degree of overlap between a shortest skeleton and a longest skeleton. The degree of overlap may be determined using overlap statistics.

According to another exemplary embodiment, a determination as to whether to overlay skeleton data acquired using different directions θ and/or different depth contrast threshold values 'T' may be made based on the degree of overlap of regions corresponding to skeleton points or skeletons. Hereinafter, a further detailed description is provided with reference to FIG. 8.

Figure 8:
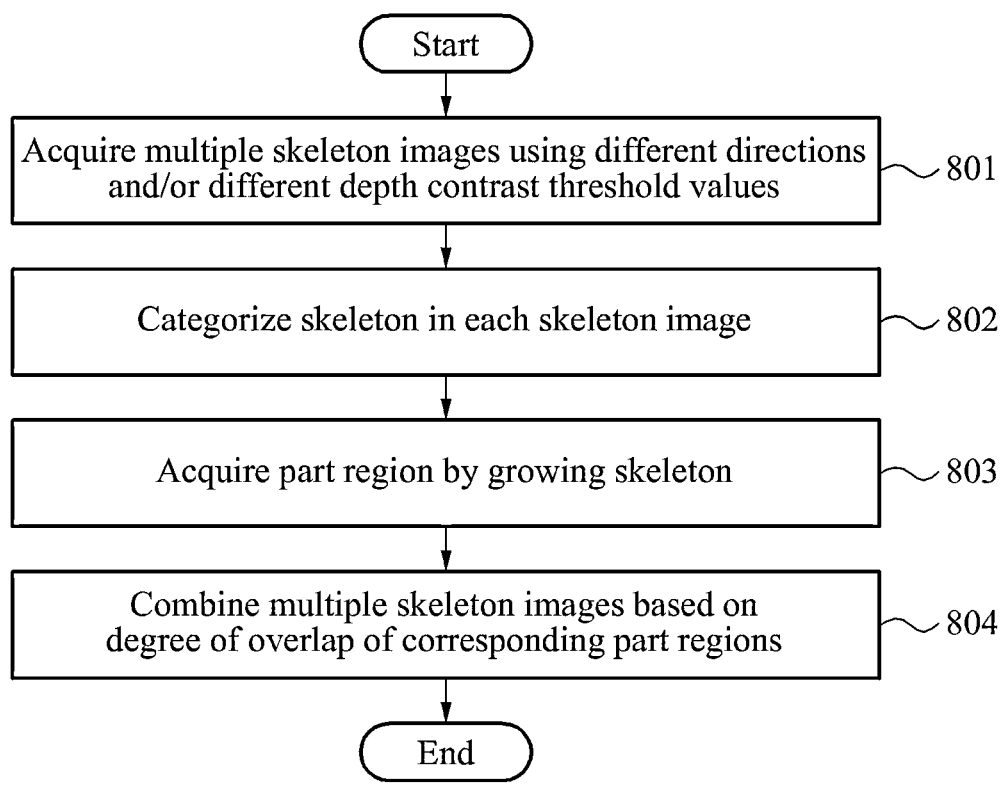
FIG. 8 is a flowchart illustrating overlaying of skeleton data acquired under different conditions according to an exemplary embodiment.

FIG. 8 is a flowchart illustrating overlaying of skeleton data acquired under different conditions according to an exemplary embodiment.

Referring to FIG. 8, in operation 801, a plurality of groups of skeletons and a plurality of skeleton images may be acquired using different predetermined directions θ and/or different depth contrast threshold values 'T'. Each of the predetermined directions θ and/or each of the depth contrast threshold values 'T' may correspond to one group of skeletons and one skeleton image. For example, twelve groups of skeletons and twelve skeleton images may be acquired using three predetermined directions θ and/or four depth contrast threshold values 'T'.

Hereinafter, for convenience and ease of description, a depth image representing skeleton data may be referred to as a skeleton image.

In operation 802, skeletons included in each skeleton image may be classified based on a type of body part by the constraints of location and depth continuity.

The type of body part may include a predetermined part of the human body, for example, an upper limb, a lower limb, a torso, and a head. Other body parts may be classified and the above mentioned body parts are merely examples. For example, hands, feet, including fingers and toes may be classified as a type of body part. Moreover, the disclosure herein is not limited to humans, and may include other life forms, for example, animals.

In operation 803, a body part region may be acquired by extending a corresponding skeleton in each skeleton image for each type of body part.

Hereinafter, a further detailed description is provided. During scanning, each skeleton point may be extended to a point located at a distance $l_x$ in a fixed direction θ and a point located at the distance $l_x$ in a direction opposite to the direction θ, whereby one line may be obtained, and this process may be performed on all the skeleton points. Accordingly, one connected region, namely, a body part region may be acquired.

Also, pixel extension may be used to acquire a body part region.

An upper limb region, a lower limb region, a torso region, and a head region corresponding to the type of body part, for example, an upper limb, a lower limb, a torso, and a head may be acquired.

For example, a region acquired by extending a skeleton corresponding to an upper limb in the skeleton image may correspond to an upper limb region. Accordingly, a number of upper limb regions equal to a number of groups of skeletons may be acquired. For example, twelve upper limb regions may be acquired using three predetermined directions θ and four depth contrast threshold values 'T'.

In this instance, rough classification may be performed on the human body region.

In operation 804, the skeletons included in the skeleton images may be overlaid based on the degree of overlap of the body part regions acquired by extending the skeletons. For example, skeletons corresponding to a torso in different skeleton images may be overlaid based on the degree of overlap of torso regions acquired by extending the skeletons.

When the degree of overlap of the corresponding body part regions is greater than a predetermined threshold, a longest skeleton may be determined to be a final skeleton, and when the degree of overlap of the corresponding body part regions is lower than or equal to the predetermined threshold, overlay may be executed.

The degree of overlap may include, for example, the degree of overlap between a shortest skeleton and a longest skeleton. The degree of overlap may be determined using overlap statistics.

For example, in a case in which the predetermined threshold is set to 50%, when the degree of overlap of left arm regions acquired by extending skeletons corresponding to a left arm in FIGS. 4A and 4B is about 80% or greater, the skeleton corresponding to the left arm in FIG. 4A may be determined to be a final skeleton. However, the disclosure herein is not limited to a predetermined threshold value of 50%, and other values may be used.

FIG. 5B illustrates a result obtained by overlaying FIG. 4A with FIG. 4B based on overlap. A result of noise reduction may be found from FIG. 5B.

According to another exemplary embodiment, a plurality of groups of skeletons may be acquired using different predetermined directions θ and/or different depth contrast threshold values 'T', and skeletons acquired using the same depth contrast threshold value 'T' may be overlaid. Accordingly, a number of groups of skeletons equal to a number of the depth contrast threshold values 'T' used may be acquired. A skeleton corresponding to a relatively high depth contrast threshold value 'T', for example, a depth contrast threshold value 'T' higher than a predetermined threshold value TL, may be referred to as a foreground skeleton, and a skeleton corresponding to a relatively low depth contrast threshold value 'T', for example, a depth contrast threshold value 'T' lower than or equal to a predetermined threshold value TL, may be referred to as a depth skeleton.

The depth skeleton may reflect more details than the foreground skeleton.

A region acquired by extending a foreground skeleton in a depth image may be referred to as a foreground body part region, and a depth image including a foreground body part region may be referred to as a low-resolution skeleton image.

A region acquired by extending a depth skeleton included in a depth image may be referred to as a depth body part region, and a depth image including a depth body part region may be referred to as a high-resolution skeleton image. That is, a depth image including the depth body part region may correspond to a skeleton image having a relatively higher resolution than the resolution of a skeleton image of a depth image including the foreground body part region.

A minimum energy skeleton scan may be conducted using two different depth contrast threshold values 'T' in two directions, for example, a vertical direction and a horizontal direction. However, the disclosure is not limited to only scanning in vertical and horizontal directions. For example, scans may be performed in diagonal directions which are perpendicular to one another.

Four groups of skeletons may be acquired by conducting a minimum energy skeleton scan using two different directions and two different depth contrast threshold values 'T'.

A first foreground skeleton may be acquired by conducting a minimum energy skeleton scan on a depth image using a first depth contrast threshold value 'T' in a first direction.

A first depth skeleton may be acquired by conducting a minimum energy skeleton scan on the depth image using a second depth contrast threshold value 'T' in the first direction. The first depth contrast threshold value 'T' may be higher than the second depth contrast threshold value 'T'.

A second foreground skeleton may be acquired by conducting a minimum energy skeleton scan on the depth image using the first depth contrast threshold value 'T' in a second direction.

A second depth skeleton may be acquired by conducting a minimum energy skeleton scan on the depth image using the second depth contrast threshold value 'T' in the second direction.

The skeletons in each group of skeletons may be classified based on a type of body part by continuous constraints of location and depth. In this instance, a skeleton shorter than a predetermined threshold may be removed to reduce noise.

In each group of skeletons, a body part region may be acquired by extending a skeleton corresponding to each type of body part.

For each type of body part, a process of overlaying may be executed based on the degree of overlap of the body part regions corresponding to the four groups of skeletons. When the degree of overlap of the corresponding regions is greater than a predetermined threshold, a longest skeleton may be determined to be a final skeleton, and when the degree of overlap of the corresponding regions is lower than or equal to the predetermined threshold, a process of overlaying may be executed.

For another example, the foreground skeleton and the depth skeleton may be acquired by overlaying first and second foreground skeletons and overlaying first and second depth skeletons, respectively, rather than using the four groups of skeletons.

The foreground skeleton may be acquired by overlaying the first foreground skeleton with the second foreground skeleton based on the degree of overlap of a plurality of regions corresponding to the first foreground skeleton and the second foreground skeleton. The depth skeleton may be acquired by overlaying the first depth skeleton with the second depth skeleton based on the degree of overlap of a plurality of regions corresponding to the first depth skeleton and the second depth skeleton.

A region acquired by extending the foreground skeleton may be referred to as a foreground body part region, and a region acquired by extending the depth skeleton may be referred to as a depth body part region.

The skeleton data acquired in the foregoing may be used for practical applications, for example, human-machine interaction, medical applications, and the like. Also, the skeleton data may allow accurate parsing of each part of the human body in the received depth image.

Hereinafter, parsing of each part of the human body in the depth image is described in further detail. In this instance, the apparatus 100 for parsing a human body image may further include a part parsing unit 600, described below with respect to FIG. 6.

Figure 6:
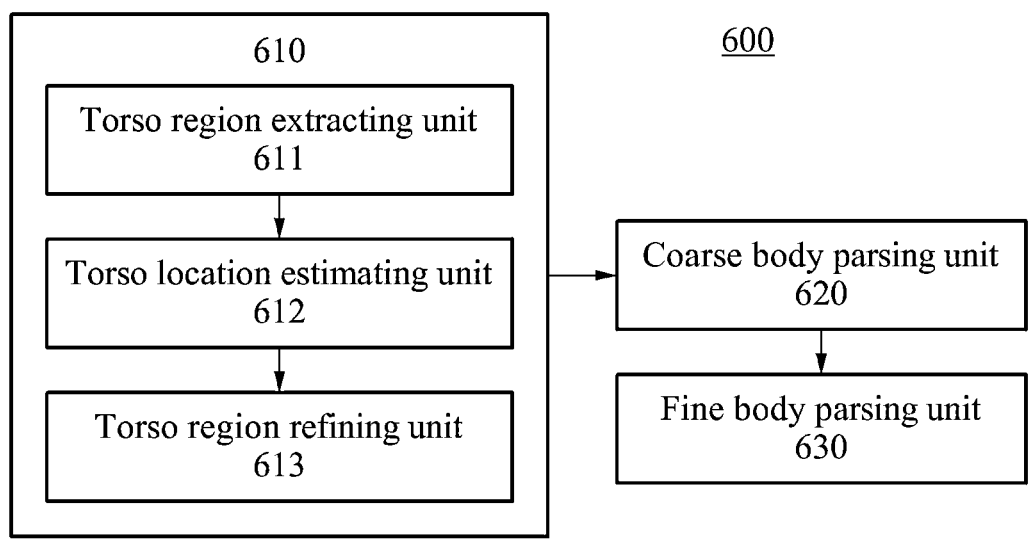
FIG. 6 illustrates a part parsing unit according to an exemplary embodiment.

FIG. 6 illustrates a part parsing unit 600 according to an exemplary embodiment.

Referring to FIG. 6, the part parsing unit 600 may include a torso segmentation unit 610, a coarse body parsing unit 620, and a fine body parsing unit 630.

The torso segmentation unit 610 may include a torso region extracting unit 611, a torso location estimating unit 612, and a torso region refining unit 613.

Figure 7A:
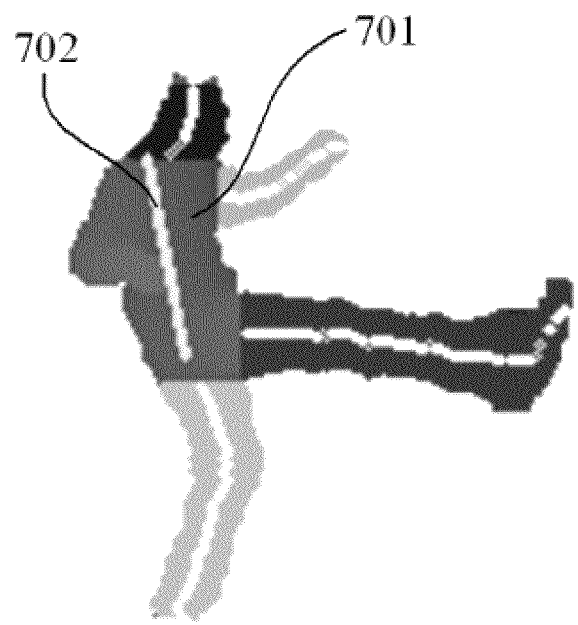
FIGS. 7A and 7B illustrate parsing of a torso region according to an exemplary embodiment.

The torso region extracting unit 611 may determine a torso region, for example torso region 701 of FIG. 7A, in a foreground body part region of a low-resolution skeleton image.

The torso may correspond to a visible largest human body part. The size of the torso may be different from those of the four limbs. It may be found from a four-limb foreground region that a majority of the torso region is located in a non-limb foreground region. Accordingly, the torso region may be determined easily.

The torso location estimating unit 612 may acquire a skeleton 702 corresponding to the torso in the torso region. The torso location estimating unit 612 may extract skeleton points of the torso region by conducting a minimum energy skeleton scan on the torso region. The torso location estimating unit 612 may acquire the skeleton 702 corresponding to the torso by matching the skeleton points.

Figure 7B:
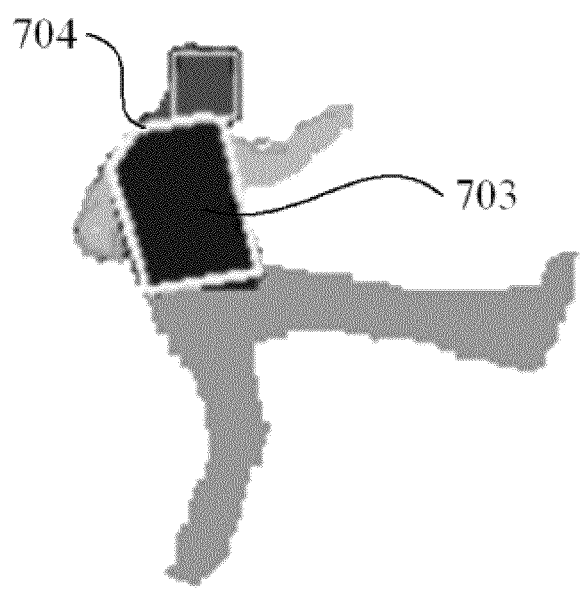

The torso region refining unit 613 may acquire a more accurate, fine torso region 703 of FIG. 7B by optimizing the torso region determined by the torso region extracting unit 611.

In the whole body region, a region below the center of the human body may be referred to as a lower limb region. The left and right edges of the torso region may be determined by scanning in the left and right directions from the center to the background region or the four-limb foreground region along the skeleton. Here, the background region may be determined through the preprocessing unit 120.

When a head is scanned in advance and a head region is found to be located within the torso region, the upper edge 704 of the torso region may be adjusted based on the head region. The head may be scanned in advance by the preprocessing unit 120 or another unit.

The coarse body parsing unit 620 may parse a non-limb part in the foreground body part region based on the torso region determined by the torso segmentation unit 610.

Generally, a head, an upper limb, and a lower limb are connected to the torso at different positions, and a relative location of the positions may be fixed. Accordingly, the non-limb region, for example, a head region, an upper limb region, and a lower limb region, may be parsed based on a connected location with the torso region.

In the foreground body part region, the head and the torso may appear to be unseparated, for example, they may appear to overlap each other. Since it may be impossible to detect the head region in the foreground body part region, the head region may need to be detected in the depth body part region of the high-resolution skeleton image. This is because the depth body part region has more detailed skeletons than the foreground body part region. The head region may be detected based on a size of the head and a relative location of the head to the torso. The edges of the torso region may be adjusted using the detected head region The fine body parsing unit 630 may optimize the parsed body part region using the depth body part region. The fine body parsing unit 630 may segment or optimize an upper limb region using the depth body part region corresponding to four limbs, and may segment a lower limb region into legs and hips.

After coarse parsing of the upper limb region is completed, a region overlapping with the parsed upper limb region may be searched for in the depth body part region, and the upper limb region may be extended to the depth body part region.

Figure 9A:
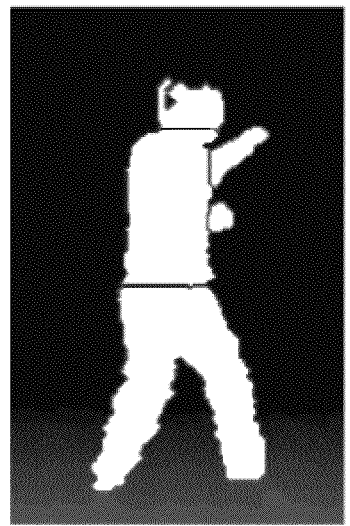
FIGS. 9A through 9C illustrate examples of processing results by a fine body parsing unit according to an exemplary embodiment.
Figure 9B:
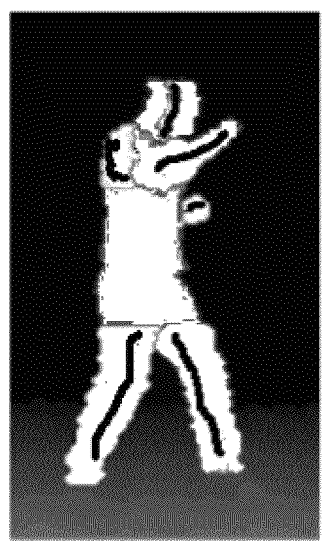
Figure 9C:
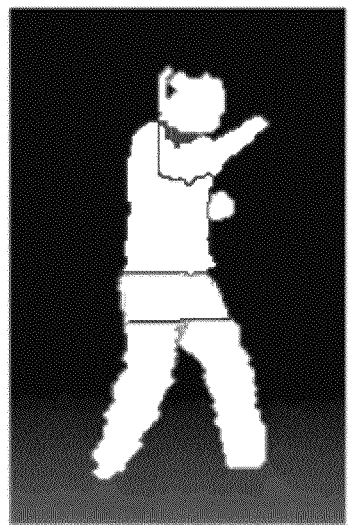

FIGS. 9A through 9C illustrate examples of processing results by the fine body parsing unit 630 of FIG. 6.

FIG. 9A illustrates a parsed part by the coarse body parsing unit 620. FIG. 9B illustrates a high-resolution skeleton image including a depth body part region. FIG. 9C illustrates an output result by the torso region refining unit 613.

As shown in FIG. 9A, only a portion of an arm displayed in the front is parsed by the coarse body parsing unit 620, and the remaining portion of the arm fails to be parsed because the corresponding portion overlaps the torso. As shown in FIG. 9B, the arm region of FIG. 9A may be extended to a corresponding depth body part region. As shown in FIG. 9C, a full arm region may be acquired.

When an upper limb region fails to be parsed during coarse body parsing, the parsed depth body part region corresponding to the head and/or the torso may be searched for in a high-resolution skeleton image, and depth body part regions having different depths from that of a neighbor in the depth body part region may be determined to be a candidate upper limb region. The candidate upper limb regions may be filtered based on a type of depth contrast through being compared to the neighbor. A candidate upper limb region having a higher depth than that of the neighbor may be removed. Among the remaining candidate upper limb regions, a final upper limb region may be determined based on a combination of a relative size and a location.

To segment the parsed lower limb region into hips and legs, among the parsed lower limb region, the lower limb region in the depth body part region may be determined to be legs, and the remaining region may be determined to be hips.

As shown in FIG. 9A, the lower limb region parsed by the coarse body parsing unit 620 includes the legs and the hips, but the legs and hips appear to be unseparated. When the lower limb region of FIG. 9B is applied to FIG. 9A, a leg region may be acquired as shown in FIG. 9C. In turn, a hip region may be acquired.

The units described herein may refer to hardware components. A person having ordinary skill in the art may implement the units using, as an example, a field-programmable gate array (FPGA), an application-specific integrated circuit (ASIC), and the like, in a defined manner. Accordingly, the units described herein may also refer to software components.

Figure 10:
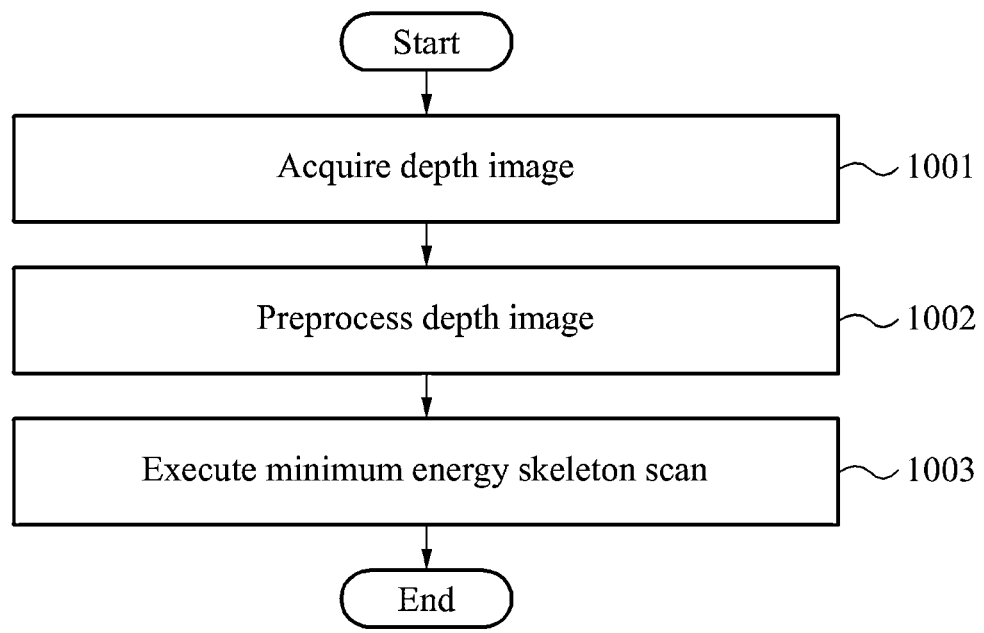
FIG. 10 is a flowchart illustrating a method of parsing a human body image according to an exemplary embodiment.

FIG. 10 is a flowchart illustrating a method of parsing a human body image according to an exemplary embodiment.

Referring to FIG. 10, in operation 1001, a depth image including a human body may be acquired. The depth image may be acquired from a source, for example, a depth image photographing device, a storage device, and/or over a wired and/or wireless network, and the like.

In operation 1002, the acquired depth image may be preprocessed. The preprocessed depth image may be acquired by filtering out noise from the acquired depth image and by removing a background region from the depth image. The background region may be removed from the depth image using various background removal techniques. Through preprocessing, a coarse human body region may be acquired free of a background.

Optionally, preprocessing for the depth image may be omitted in operation 1002.

In operation 1003, skeleton points or skeletons may be acquired by conducting a minimum energy skeleton scan on the acquired depth image or the preprocessed depth image.

The minimum energy skeleton scan may be conducted in a manner being used by the skeleton scanning unit 130. The skeleton data may be extracted in a manner described with reference to FIGS. 2 through 5 and FIG. 8, for example.

The extracted skeleton points or skeleton lines may be implemented in various applications. For example, since the skeleton points or the skeletons provide an overall location and shape for human body parts, various human body poses may be estimated simply and readily.

Figure 11:
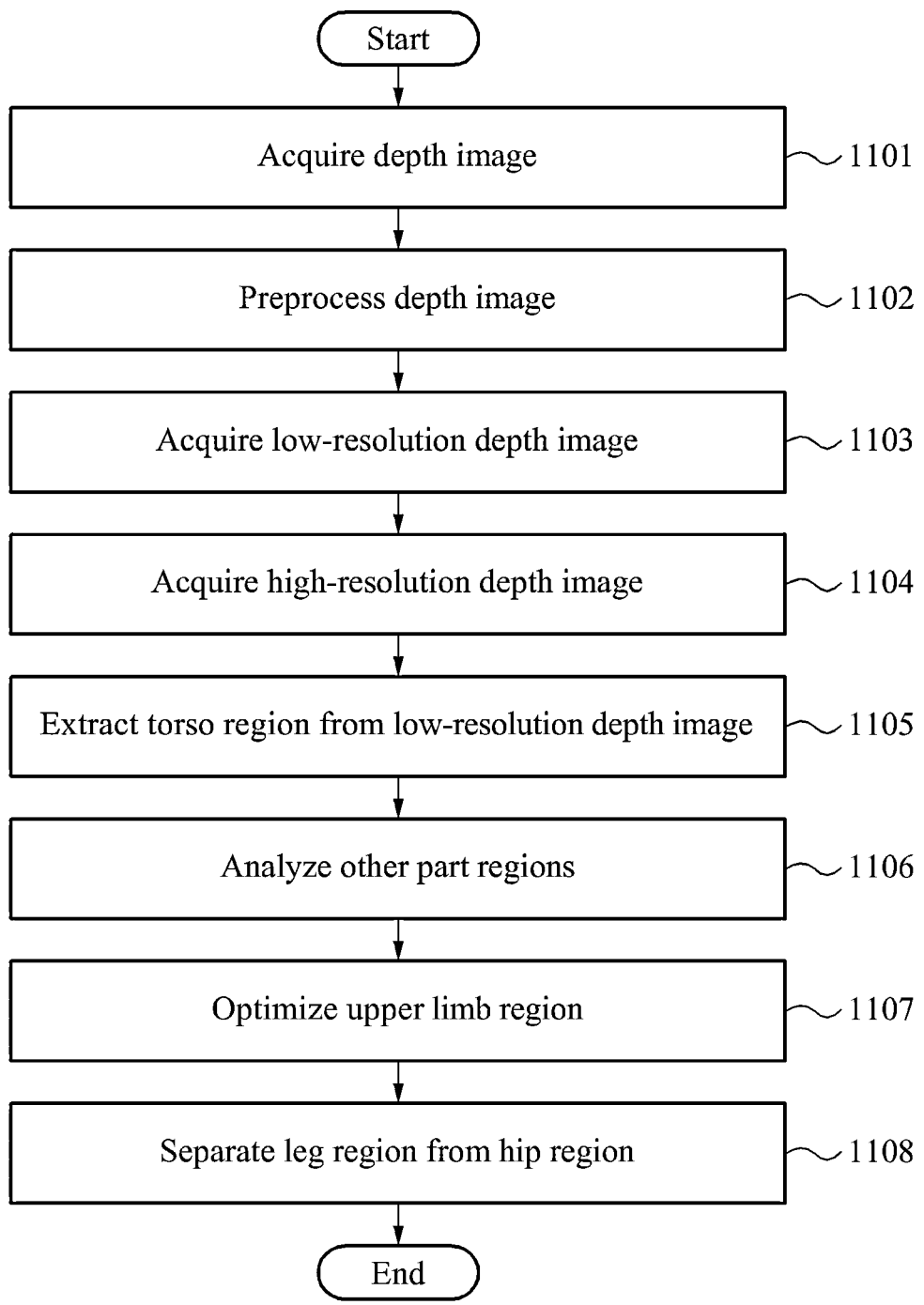
FIG. 11 is a flowchart illustrating a method of parsing a human body image according to another exemplary embodiment.

FIG. 11 is a flowchart illustrating a method of parsing a human body image according to another exemplary embodiment.

Referring to FIG. 11, a depth image including a human body may be acquired. The depth image may be acquired from a source, for example, a depth image photographing device, a storage device, over a wired and/or wireless network, and the like.

In operation 1102, the acquired depth image may be preprocessed. The preprocessed depth image may be acquired by filtering off noise from the acquired depth image and by removing a background region from the depth image. The background region may be removed from the depth image using various background removal techniques. Through preprocessing, a coarse human body region free of background may be acquired.

Optionally, preprocessing for the depth image may be omitted in operation 1102.

In operation 1103, a low-resolution skeleton image may be acquired by conducting a minimum energy skeleton scan using a relatively high depth contrast threshold value 'T'. For example, a depth contrast threshold value 'T' higher than a predetermined threshold value TL may be used. The low-resolution skeleton image may include a foreground body part region.

In operation 1104, a high-resolution skeleton image may be acquired by conducting a minimum energy skeleton scan using a relatively low depth contrast threshold value 'T'. For example, a depth contrast threshold value 'T' lower than or equal to a predetermined threshold value TL may be used. The high-resolution skeleton image may include a depth body part region.

In operation 1105, a torso region may be extracted from the low-resolution skeleton image. Referring to FIG. 7 as an example, the torso region 701 may be determined based on a size and a location of each foreground body part region in the low-resolution skeleton image. The skeleton 702 may be extracted from the torso region by conducting a minimum energy skeleton scan on the torso region. In the whole body region, a region below the center of the human body may be determined to be a lower limb region, and the fine torso region 703 may be acquired by excluding the lower limb region from the torso region 701. The left and right edges of the torso region may be determined by scanning in the left and right directions. For example, scanning in the left and right directions may be performed starting from the center of the torso region to the background region or the four-limb region along the skeleton. When a head region is located within the low-resolution skeleton image, the upper edge 704 of the torso region may be adjusted based on the head region.

Operation 1105 may be performed in a manner being executed by the torso segmentation unit 610.

In operation 1106, a non-limb region in the foreground body part region may be parsed based on the torso region. The non-limb region, for example, a head region, an upper limb region, and a lower limb region, may be parsed based on a location in which the non-limb region is connected with the torso region in the low-resolution skeleton image.

In the foreground body part region, the head and the torso may appear to be unseparated, for example, the head and the torso may overlap each other. Since it may be impossible to detect the head region in the foreground body part region, the head region may need to be detected in the depth body part region of the high-resolution skeleton image. This is because the depth body part region has more detailed skeletons than the foreground body part region. The head region may be detected based on a size of the head and a relative location of the head to the torso. The edges of the torso region may be adjusted using the detected head region.

Operation 1106 may be performed in a manner being executed by the coarse body parsing unit 620.

In operation 1107, an upper limb region may be optimized using a depth body part region corresponding to an upper limb in the high-resolution skeleton image.

When the upper limb region is parsed in operation 1106, a depth body part region overlapping with the parsed upper limb region may be searched for in the depth body part region, and the parsed upper limb region may be extended to the depth body part region.

When the upper limb region fails to be parsed in operation 1106, the parsed depth body part region corresponding to the head and/or the torso may be searched for in the high-resolution skeleton image, and depth body part regions having different depths from that of a neighbor in the depth body part region may be determined to be a candidate upper limb region. The candidate upper limb regions may be filtered based on a type of depth contrast by comparing to the neighbor. A candidate upper limb region having a higher depth than that of the neighbor may be removed. Among the remaining candidate upper limb regions, a final upper limb region may be determined based on a combination of a relative size, a location, and/or a depth contrast.

Here, the type of depth contrast may include a depth of a skeleton point lower than depths at both of the sides, a depth of a skeleton point lower than a depth at one side and higher than a depth at the other side, and a depth of a skeleton point higher than depths at both of the sides. Generally, when the upper limb is located within the torso, the depth of skeleton points corresponding to the upper limb may be lower than depths at both sides, because of being predicted to be close to a video camera, and a high reliability coefficient may be assigned to a skeleton line corresponding to this type of depth contrast. For example, if an upper limb (e.g., an arm) is positioned in front of the torso, a depth value of skeleton points corresponding to the upper limb may be higher than a depth value of skeleton points corresponding to the torso region having skeleton points above and below the upper limb (e.g., on either side of the upper limb in a vertical direction). When the depth of skeleton points are higher than depths at both of the sides, because of being predicted to be distant from a video camera, a low reliability coefficient may be assigned to a skeleton line corresponding to this type of depth contrast, and may be filtered off.

In operation 1108, the lower limb region may be segmented into hips and legs using the high-resolution depth image. To segment the parsed lower limb region into hips and legs, a region corresponding to a lower limb in the depth body part region may be determined to be the legs in the parsed lower limb region, and the remaining region may be determined to be the hips.

Operations 1107 and 1108 may be performed in a manner being executed by the fine body parsing unit 630.

According to the exemplary embodiments, the apparatus and method for parsing a human body image may implement pose estimation, pose tracking, and body modeling using parsed skeleton data, for example, skeleton points or skeletons, representing an overall position and shape of a human body in a depth image.

Also, the apparatus and method for parsing a human body image may achieve accurate skeleton-based parsing of each part of a human body.

The apparatus and method for parsing a human body image according to the above-described example embodiments may include a depth image photographing device (for example, a camera, digital camera, digital video camera, etc.), which may be used to receive a depth image of an object, for example, a human body or animal body. Additionally, or alternatively, the depth image may be retrieved or obtained from a storage device. The storage device may be realized for example, using a non-volatile memory device such as a read only memory (ROM), a random access memory (RAM), a programmable read only memory (PROM), an erasable programmable read only memory (EPROM), or a flash memory, a volatile memory device such as a random access memory (RAM), or a storage medium such as a hard disk or optical disk. The depth image, human body image, the parsed human body image, and/or other images obtained by the apparatus and method for parsing a human body image according to the above-described example embodiments, may be displayed via a display panel (for example, a plasma display panel, a LCD display panel, a LED display panel, an OLED display panel, etc.), and the like.

The apparatus and methods apparatus and method for parsing a human body image according to the above-described example embodiments may use one or more processors, which may include a microprocessor, central processing unit (CPU), digital signal processor (DSP), or application-specific integrated circuit (ASIC), as well as portions or combinations of these and other processing devices.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The method for parsing a human body image according to the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations of the above-described embodiments, or vice versa. The program instructions may be executed by one or more processors. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although example embodiments have been shown and described, it would be appreciated by those skilled in the art that changes may be made to these embodiments without departing from the principles and spirit of the disclosure, the scope of which is defined by the claims and their equivalents.

What is claimed is:

1. A method of parsing a human body image, the method comprising:
   acquiring a depth image including a human body; and
   detecting a plurality of points in the acquired depth image by conducting a minimum energy skeleton scan on the depth image,
   wherein the minimum energy skeleton scan corresponds to detection of the plurality of points in the depth image by minimizing an energy function for the depth image, the plurality of points corresponding to a skeleton point, and
   the energy function corresponds to a logarithm of a sum of opposite numbers for a probability that a pixel of the depth image is predicted as a skeleton point or a non-skeleton point.

2. The method of claim 1, wherein a pixel is determined to be a skeleton point when the probability that the pixel is predicted as a skeleton point is applied to the sum of opposite numbers and the energy function is minimized, and is determined to be a non-skeleton point when the probability that the pixel is predicted as a non-skeleton point is applied to the sum of opposite numbers and the energy function is minimized.

3. The method of claim 2, wherein the probability that a pixel is predicted as a non-skeleton point is determined by a normalized value of a smallest value among a depth contrast of a predetermined direction, a depth contrast of a direction opposite to the predetermined direction, and a depth contrast threshold value.

4. The method of claim 3, wherein the depth contrast of the predetermined direction corresponds to an absolute value of a difference in depth values between a first pixel located at a predetermined distance from the pixel in a predetermined direction and a pixel located adjacent to the first pixel.

5. The method of claim 3, wherein the adjacent pixel is located adjacent to the first pixel in the predetermined direction or a direction opposite to the predetermined direction.

6. The method of claim 4, wherein the predetermined distance corresponds to a minimum distance satisfying a depth contrast constraint in the directions, and is represented by an Equation as follows:

$$l_x = \min_{l} \max_{\theta \in [0, 2\pi]} (|d_{x,l-1,\theta} - d_{x,l,\theta}| > T) l \in (l_{min}, l_{max})$$ [Equation]

wherein 'lx' denotes the predetermined distance, ($l_{min}$/$l_{max}$) denotes a value range of a distance 'l', θ denotes a direction, T denotes a depth contrast threshold value, $d_{x,l,\theta}$ denotes a depth value of a pixel located at the predetermined distance 'l' from the pixel in the direction θ, and $d_{x,l-1,\theta}$ denotes a depth value of a pixel adjacent to the pixel located at the predetermined distance 'l' from the pixel.

7. The method of claim 3, further comprising:
acquiring a low-resolution skeleton image by conducting a minimum energy skeleton scan on the depth image using a first depth contrast threshold value; and
acquiring a high-resolution skeleton image by conducting a minimum energy skeleton scan on the depth image using a second depth contrast threshold value.

8. The method of claim 7, wherein the first depth contrast threshold value is higher than the second depth contrast threshold value.

9. The method of claim 7, wherein the acquiring of the low-resolution skeleton image comprises:
acquiring a plurality of skeleton points by conducting a minimum energy skeleton scan on the depth image using the first depth contrast threshold value;
classifying the plurality of skeleton points or a skeleton formed from the skeleton points based on a type of body part by continuous constraints of location and depth; and
acquiring a body part region by extending the skeleton corresponding to the type of body part.

10. The method of claim 7, wherein the acquiring of the high-resolution skeleton image comprises:
acquiring a plurality of skeleton points by conducting a minimum energy skeleton scan on the depth image using the second depth contrast threshold value;
classifying the plurality of skeleton points or a skeleton formed from the skeleton points based on a type of body part by continuous constraints of location and depth; and
acquiring a body part region by extending the skeleton corresponding to the type of body part.

11. The method of claim 1, wherein the conducting of the minimum energy skeleton scan on the depth image comprises:
acquiring a plurality of groups of skeleton points and a plurality of skeleton images by conducting the minimum energy skeleton scan on the depth image using at least one predetermined direction and at least two depth contrast threshold values or at least two predetermined directions and at least one depth contrast threshold value, and determining a depth image including the skeleton points to be a skeleton image;
classifying the skeletons included in the skeleton images based on a type of body part by the continuous constraints of location and depth;
acquiring a body part region by extending the skeleton corresponding to the type of body part in the skeleton image;
overlaying the skeletons extended to acquire the body part regions, based on a degree of overlap of the corresponding body part regions in the plurality of skeleton images; and
determining, to be a final skeleton, a longest skeleton among the skeletons extended to acquire the plurality of body part regions, when the degree of overlap of the corresponding body part regions in the plurality of skeleton images is greater than a predetermined threshold, and overlaying the skeletons extended to acquire the plurality of body part regions when the degree of overlap of the corresponding body part regions in the plurality of skeleton images is lower than or equal to the predetermined threshold.

12. The method of claim 11, wherein the acquiring of a low-resolution skeleton image comprises:
conducting a minimum energy skeleton scan on the depth image using at least two predetermined directions and a first depth contrast threshold value; and
extending the overlaid skeletons in the depth image.

13. The method of claim 12, wherein the acquiring of a high-resolution skeleton image comprises:
conducting a minimum energy skeleton scan on the depth image using at least two predetermined directions and a second depth contrast threshold value; and
extending the overlaid skeletons in the depth image.

14. The method of claim 7, further comprising:
extracting a torso region in a low-resolution depth image;
parsing a non-limb region in the low-resolution skeleton image based on the determined torso region;
optimizing an upper limb region using a body part region corresponding to an upper limb in a high-resolution depth image; and
segmenting a parsed lower limb region into legs and hips using the high-resolution depth image.

15. The method of claim 14, wherein the extracting comprises:
determining the torso region based on a size and a location of the body part region in the low-resolution skeleton image;
extracting a skeleton of the torso region by conducting a minimum energy skeleton scan on the determined torso region;
determining a region below the center of the whole body region to be a lower limb region, and excluding the region below the center from the determined torso region; and
determining left and right edges of the torso region by scanning in left and right directions from the center to a background region or a four-limb region along the skeleton.

16. The method of claim 14, wherein the parsing comprises parsing the non-limb region in the low-resolution skeleton image based on a connected location with the determined torso region.

17. The method of claim 14, wherein the optimizing comprises:
searching for, when a parsed upper limb region is present, a body part region overlapping with the parsed upper limb region in the high-resolution skeleton image, and extending the parsed upper limb region to the body part region; and
searching for, when the parsed upper limb region is absent, the parsed body part region corresponding to the head and/or the torso in the high-resolution skeleton image, determining body part regions having different depths from a neighboring region of the corresponding body part region to be a candidate upper limb region, removing a candidate upper limb region having a higher depth than the neighboring region, and determining a final upper limb region among the remaining candidate upper limb regions based on a combination of a relative size and a location.

18. The method of claim 14, wherein the segmenting comprises:
determining as legs, a region among the parsed lower limb region corresponding to a lower limb region in the high-resolution skeleton image; and
determining a remaining region among the parsed lower limb region as hips.

19. An apparatus for parsing a human body image, the apparatus comprising:
a depth image receiving unit to acquire a depth image including a human body; and
a skeleton scanning unit to detect a plurality of points in the acquired depth image by conducting a minimum energy skeleton scan on the depth image,
wherein the skeleton scanning unit acquires a low-resolution skeleton image by conducting a minimum energy skeleton scan on the depth image using a first depth contrast threshold value, acquires a high-resolution skeleton image by conducting a minimum energy skeleton scan on the depth image using a second depth contrast threshold value, and classifies skeletons in each skeleton image as a type of body part, based on a location and depth information of the skeleton.

20. The apparatus of claim 19, wherein the apparatus further comprises:
a part parsing unit to parse each part of the human body in the depth image, wherein the part parsing unit includes:
a torso segmentation unit to determine a torso region using the low-resolution skeleton image, to acquire a skeleton corresponding to the torso region, and to extract skeleton points of the torso region;
a coarse body parsing unit to parse a plurality of regions other than the torso region based on a relative location to the torso region; and
a fine body parsing unit to optimize a first body part region parsed by the coarse body parsing unit, using a depth body part region and the high-resolution skeleton image.

21. The apparatus of claim 20, wherein the fine body parsing unit optimizes the first body part region by determining whether the first body part region overlaps with the torso region, and extends the first body part region to the depth body part region if the first body part region overlaps the torso region.

22. The apparatus of claim 21, further comprising a pre-processing unit to preprocess the depth image received by the depth image receiving unit by filtering off noise from the depth image and removing a background region from the depth image.

23. A method of parsing an image, the method comprising:
acquiring a depth image including a plurality of pixels; and
acquiring a plurality of skeletons by performing a minimum energy skeleton scan on the depth image and analyzing each pixel from the depth image to determine whether the pixel is a skeleton point or a non-skeleton point,
wherein the minimum energy skeleton scan corresponds to detection of the plurality of pixels in the depth image by minimizing an energy function for the depth image, the plurality of pixels corresponding to a skeleton point, and
the energy function corresponds to a logarithm of a sum of opposite numbers for a probability that a pixel of the depth image is predicted as a skeleton point or a non-skeleton point.

* * * * *